B. HARDINGE.
Dissolving Chemicals.
No. 344.
Reissued Jan'y 22, 1856.
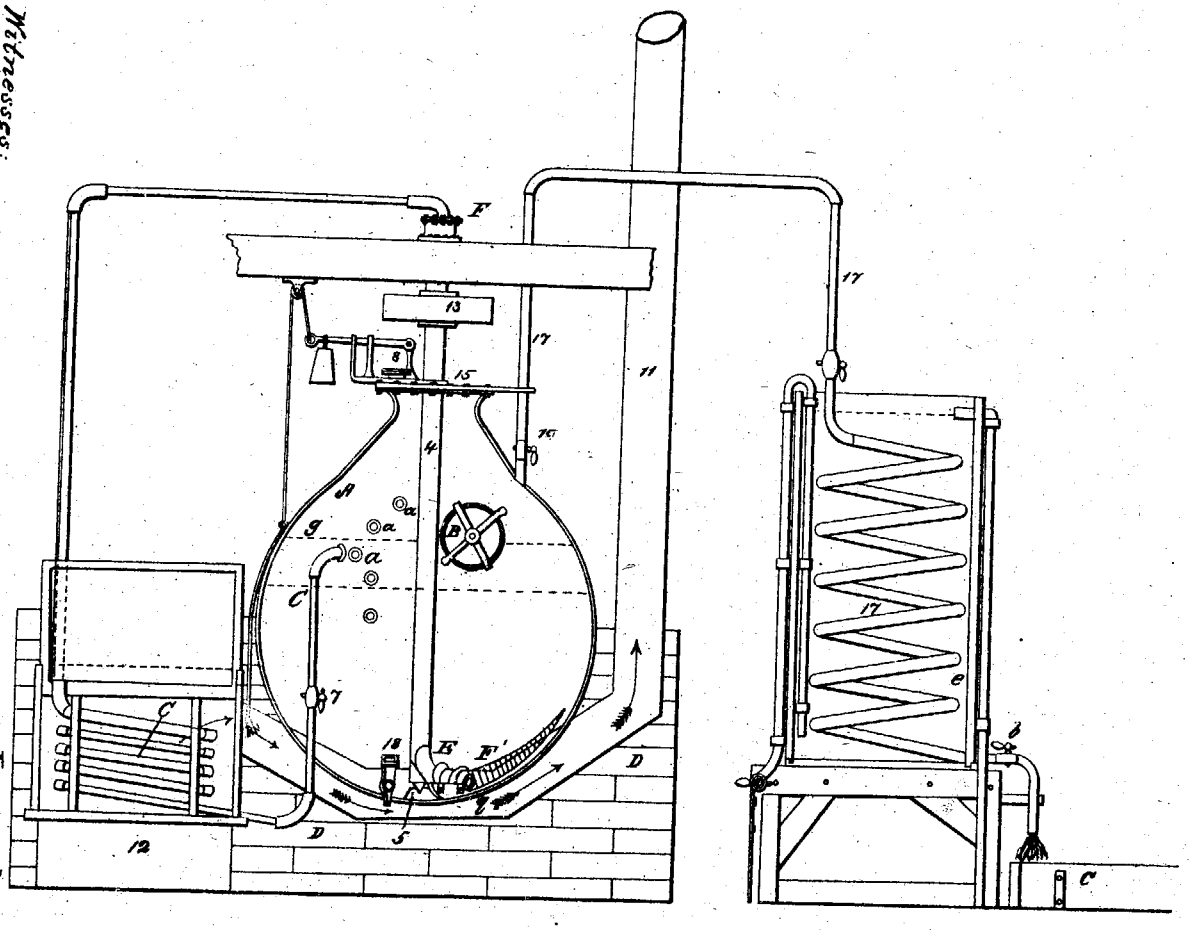
Witnesses:
Wm H Bishop
Chas A Gordon
Inventor:
Benjamin Hardinge
THE NORRIS PETERS CO., WASHINGTON, D. C.

UNITED STATES PATENT OFFICE.

BENJ. HARDINGE, OF NEW YORK, N. Y.

IMPROVEMENT IN APPARATUS FOR DISSOLVING SILICA.

Specification forming part of Letters Patent No. 12,819, dated May 8, 1855; Reissue No. 344, dated January 22, 1856.

*To all whom it may concern:*

Be it known that I, BENJAMIN HARDINGE, of the city, county, and State of New York, have invented a new and improved apparatus for dissolving silicates, silicates of soda, and other substances holding silex in excess, such as quartz-rock; and I do hereby declare that the following is a full, clear, and exact description thereof.

In my said apparatus the substance or substances to be dissolved, whether sand, gravel, or broken, pounded, or ground rock, properly prepared and mixed with solvents, are charged in a strong boiler or digester capable of sustaining a high pressure; and my said invention consists in so combining such boiler or digester with a heater that the liquid solvents shall be taken from the upper part of the charge and passed through the heater, and the vapor thereof at a high heat introduced to the lower stratum of the charge, the said digester being provided with stirrers for keeping the charge, or the lower part thereof, in motion.

And my said invention also consists in relieving the upper part of the charge from excess of pressure, that the vapor introduced to the lower part of the charge may act on the entire charge, by combining with such an apparatus a condenser through which the excess of pressure may be permitted to escape, while at the same time the hydrous silicates which escape are condensed and saved for use.

And my said invention also consists in discharging the vapor to the lower part of the charge through a pipe at the lower end of a tubular rotating shaft which carries the stirrers or scrapers, so that the steam shall be discharged from the said pipe in a direction contrary to its motion.

I construct a strong boiler or digester, A, of sufficient capacity to contain from four to five hundred gallons, more or less, and of an ovate form, as represented, preferring this form for the reasons that it is strong, presents the best form at bottom for moving the charge, and being cut off at the top, presents a strong base for supporting the machinery. This boiler or digester is set in mason-work D, with its bottom in a flue, 9, so that it shall be heated by the passage of the products of combustion from the fire-chamber of the furnace 12 to the chimney 11. One end of a pipe, C, is connected with the said boiler a little below the line *g*, which indicates the height of the intended charge. A little below the point of connection this pipe is provided with a hand-cock, 7, for opening or closing the connection, and below this the pipe C is bent in a series of coils in the fire-chamber of the furnace 12, so that it can be highly heated, and thence the pipe extends up and is connected by a suitable packing-joint, F, with the upper end of a vertical hollow shaft, 4, which is placed centrally in the boiler with its closed lower end fitted to turn in a step, 5, at bottom. At 15 the said hollow shaft passes through a stuffing-box in the top plate of the boiler, and above this the said shaft is provided with a pulley, 13, to receive a slow rotary motion by a belt from some suitable motor. At the lower end the said shaft carries a scraper, F′, the lower edge of which is curved to correspond with the form of the bottom of the boiler, and the said shaft is also provided with a branch pipe, E, which is curved around to the back of the scraper and with its discharge-aperture back of the scraper. The boiler is also provided with a man or charging hole, B, through which the charge is introduced and inclosed, with a safety-valve, 8, at top, with try-cocks *a* at the side, and with a large cock, 18, at the bottom for the discharge of the contents. Above the line *g* there is another pipe, 17, connected with the said boiler, and the said pipe is coiled in the manner of a still-worm and placed in a cold-water vessel, *e*, for the purpose of condensing the vapors from the boiler when permitted to enter the said pipe by a cock, 19, and when condensed the contents of the said pipe can be discharged by a cock, *b*, into a vat, *c*.

The substances to be dissolved, whether sand, crushed, ground, or otherwise pulverized quartz, or other silicious rock previously treated or mixed with suitable solvents, I charge into the boiler through the man-hole B, and with suitable proportion of water carrying the charge up to the line *g*, or so high that during the working the liquid portion of the charge will not descend below the connection of the pipe C. Before putting in the charge the hollow shaft 4, with its scraper, should be put and continued in motion, as the starting of the scraper would be attended with difficulty after the boiler is charged; and after the charge is completed and the man-hole closed and the fire in the furnace properly started, the cock 7 is opened to permit the liquid portion of the charge to pass through the coil of pipes in the furnace by which it is evaporated under a very high pressure. The vapor thus generated passes through the hollow shaft and is discharged at the bottom of the charge through the pipe E, back of the scraper F', and hence in that portion of the charge which has just been loosened by the passage of the scraper; and as this discharge-pipe revolves the vapor is in turn discharged in a circle at the bottom of the boiler, and thence diffuses itself through the entire charge above; and when the safety-valve indicates that the pressure is too great in the upper part of the boiler the cock in the pipe 17 is opened to communicate with the condenser to relieve the pressure. In this way the liquid portion of the charge is gradually concentrated, and when the dissolving process begins to take place the hydrous silicates which escape from the condenser can be collected in the vat *c*, or otherwise, for use. The apparatus is kept in operation until the entire charge is dissolved.

The vessel in which the condensing-pipe is placed should be filled with water, kept cold by circulation in any of the well-known modes.

I do not claim as of my invention the dissolving of silex with alkaline salts and steam under high pressure; nor do I claim heating liquids by causing them to circulate from a boiler through a coil of pipes in a furnace; but What I do claim as my invention in the before-described apparatus is—

The method of taking the liquid from the upper part of the charge in the boiler or digester containing the silicious matter and the solvents thereof, passing it through a heater and discharging the vapor thereof in the lower part of the charge, substantially as described, when this is combined with a boiler or digester provided with stirrers for stirring the charge, substantially as described.

BENJAMIN HARDINGE.

Witnesses:
WM. H. BISHOP,
ANDREW DE LACY.